United States Patent [19]

Gordon

[11] Patent Number: 4,686,896
[45] Date of Patent: Aug. 18, 1987

[54] PRESSURE SMOKER

[75] Inventor: Jerry D. Gordon, Tulsa, Okla.

[73] Assignee: Henny Penny Corporation, Eaton, Ohio

[21] Appl. No.: 863,576

[22] Filed: May 15, 1986

[51] Int. Cl.⁴ .............................................. A23B 4/04
[52] U.S. Cl. ...................................... 99/482; 99/332; 99/444; 99/468; 99/483; 426/314; 426/315
[58] Field of Search ................. 99/325, 326, 327, 328, 99/329 R, 331, 332, 343, 344, 425, 444, 467, 481, 483, 485, 419, 468, 469; 426/314, 315

[56] References Cited

U.S. PATENT DOCUMENTS

| | | | |
|---|---|---|---|
| 2,906,191 | 9/1959 | Lee | 99/342 |
| 3,583,307 | 6/1971 | Lee | 99/357 |
| 4,094,295 | 6/1978 | Heyman | 99/444 |
| 4,355,570 | 10/1982 | Martin | 99/482 |
| 4,467,709 | 8/1984 | Anstedt | 99/482 |
| 4,512,249 | 4/1985 | Mentzel | 99/482 |

Primary Examiner—Robert W. Jenkins
Attorney, Agent, or Firm—Frost & Jacobs

[57] ABSTRACT

A pressure smoker having a stainless steel cooking vessel including a smoke generating cavity, the cooking vessel being heated by electric heating elements positioned to heat the walls of the vessel while creating a cool area at the bottom of the vessel, the smoke generating cavity having a separate heating element, the controls for the smoker including separate controls for the heating elements for the vessel and the heating element for the smoke generating cavity, and pressure responsive valves to control both heat and pressure within the cooking vessel.

12 Claims, 5 Drawing Figures 4,686,896

PRESSURE SMOKER

This invention relates to pressure cookers and more particularly to a pressure smoker wherein wood smoke or other aromatic smoke is generated in the pressure vessel to flavor the food being cooked.

BACKGROUND OF THE INVENTION

Pressure cookers have been known and used for many years and have been utilized to cook diverse types of foods under both heat and pressure. In the fast food industry, pressure fryers are utilized to cook foods in cooking oil, the cooking oil serving to rapidly cook the food while retaining its natural moisture and flavor. Customarily, the food, such as fish or chicken, is dipped in a batter, breaded, and then placed in the cooker.

More recently pressure cookers have been developed in which the food is smoked as it is being cooked, the cooking vessel being provided with a smoke generator by means of which wood chips or other flavor producing ingredients may be charred to produce smoke which will permeate the meat and give it a distinctive taste. Such pressure smokers do not utilize cooking oil as a cooking vehicle, but rather rely on the moisture in the food being cooked to generate steam under pressure. By way of example, U.S. Pat. Nos. 2,906,191 and 3,583,307 teach pressure smokers as characterized above.

All known pressure smokers utilize aluminum cooking vessels which are highly heat conductive and hence rapidly heat the walls of the cooking vessel, including its bottom, the wall surfaces of the cooking vessel reaching temperatures as high as 700° F. In commercial pressure smokers, the food being cooked is supported on a removable rack placed in the cooking vessel, the rack having a drip pan at its lowermost end which collects grease dripping from the meat. Due to the high temperatures within the cooking vessel, particularly at the bottom of the vessel, the drippings will tend to boil and vaporize, splattering oil on the walls of the vessel where it tends to char, thereby generating vaporized oil and grease smoke which permeates the meat and conflicts with the flavoring intended to be imparted to the meat by the wood chips or other flavoring ingredients.

SUMMARY OF THE INVENTION

In contrast to the prior art, the present invention utilizes a cooking vessel made of stainless steel, which preferably is of rectangular configuration to enhance its capacity. While rectangular stainless steel cooking vessels have heretofore been used in pressure fryers, they are not known to have been used in pressure smokers. Stainless steel has a much lower degree of heat conductivity than aluminum, and hence is slower to heat. It has been found that this attribute is beneficial to the smoking process and improves the quality of the smoked food.

In accordance with the invention, the heating elements which are utilized to heat the cooking vessel are arranged to extend horizontally about the side and front walls of the vessel intermediate its upper and lower ends, rather than being placed beneath the bottom of the vessel or adjacent its lowermost ends. This arrangemnet, coupled with the use of a stainless steel cooking vessel, provides an essentially cool area at the bottom of the vessel which is normally under 150° F. even when the side walls of the vessel reach temperatures in excess of 500° F. This arrangement has been found to enhance the effectiveness of the smoking process and the flavor of the smoked food by effectively eliminating splattering and charring of the grease collected in the grease pan, thereby avoiding the generation of grease laden smoke which will permeate the meat and interfere with the flavor being imparted to the meat by the wood chips or other flavor producing material.

The present invention also provides a pressure smoker with improved operating controls which insure reliable cooking and individual control of the heating elements for both the cooking vessel and the smoke generator, thereby affording the operator optimum control over both smoking and cooking of the meat.

DESCRIPTION OF THE PREFERRED EMBODIMENT

Figure 1:
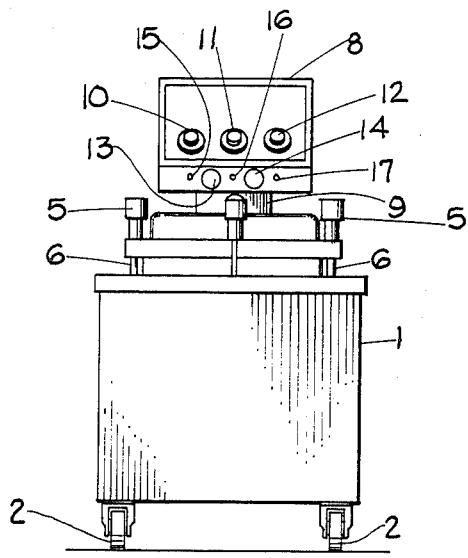
FIG. 1 is a front elevational view of a pressure smoker in accordance with the invention.
Figure 2:
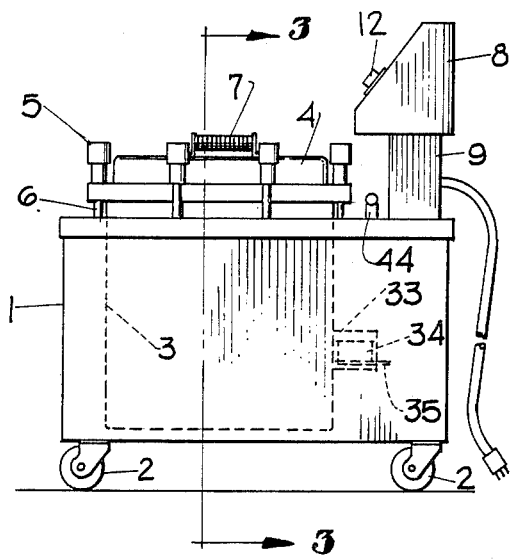
FIG. 2 is a side elevational view thereof with interior parts indicated by dotted lines.

Referring first to FIGS. 1 and 2 of the drawings, a pressure smoker in accordance with the invention comprises a housing 1 preferably having caster wheels 2 at its lowermost end for convenience in moving the unit from place-to-place. Mounted within the housing 1 is a pressure vessel 3 having front, rear and side walls, and and a bottom wall. The upper end of the cooking vessel is open and is adapted to be closed by a cover or lid 4 adapted to seat on top of the cooking vessel 3 where it is held in place by a series of turn down knobs 5 which engage threaded bolts 6 extending upwardly from the housing 2, the bolts being pivotally mounted so as to permit them to be lowered to a horizontal position when the lid 4 is lifted from the cooking vessel by means of the handle 7. This arrangement is essentially conventional and serves to seal the lid to the top of the cooking vessel, and to this end either the undersurface of the lid or the periphery of the cooking vessel may be provided with a seal to effect pressure tight engagement between the rim of the vessel and the lid.

In the embodiment illustrated, the controls for the device are mounted on a console at the rear of the housing 1, the console preferably being affixed to a pedestal 9 projecting upwardly from the housing 1. The controls comprise a smoking timer 10, a temperature controller 11, and a cooking timer 12. A pressure gauge 13 and a temperature gauge 14 are also provided, together with indicator lights 15, 16 and 17 which indicate the operating condition of the smoking timer, temperature controller, and cooking timer, respectively. The operation of these controls will be discussed in greater details hereinafter.

The pressure vessel 3 is preferably of rectangular configuration and formed from stainless steel which has a substantially lower rate of heat conductivity than aluminum, which has heretofore been used for pressure smokers. The lid 4 also may be made of stainless steel, although it may be formed as an aluminum casting since the critical consideration is providing a cooking vessel having low heat conductivity in its wall and bottom areas.

Figure 3:
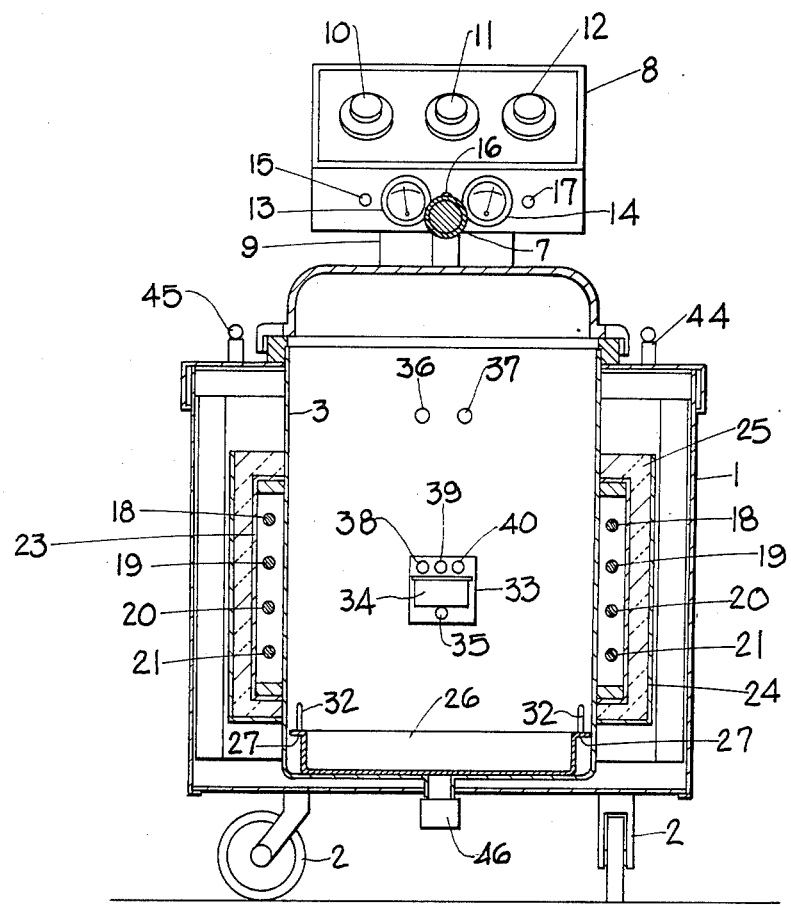
FIG. 3 is an enlarged vertical sectional view taken along the line 3—3 of FIG. 2.

As seen in FIG. 3, the cooking vessel is heated by means of a series of electrical heating elements, such as the elements 18, 19, 20 and 21, the elements being in the form of continuous rods extending along the sides and front of the cooking vessel in spaced relation to its walls. The heating elements lie in spaced relation to each other and are spaced from the top and bottom ends of the vessel, the heat from the heating elements being concentrated toward the central portions of the walls. The heating elements are surrounded by an inner shroud 23 and an outer shroud 24, the space between the inner and outer shrouds being filled with insulation 25. The heat from the heating element is thus directly inwardly against the front and side walls of the vessel. Importantly, the bottom of the vessel is uninsulated and is remote from the heating elements thereby achieving a relatively cool zone at the bottom of the cooking vessel. The bottom of the vessel may be provided with a ball valve 46 which may be opened to drain the vessel if needed.

Figure 4:
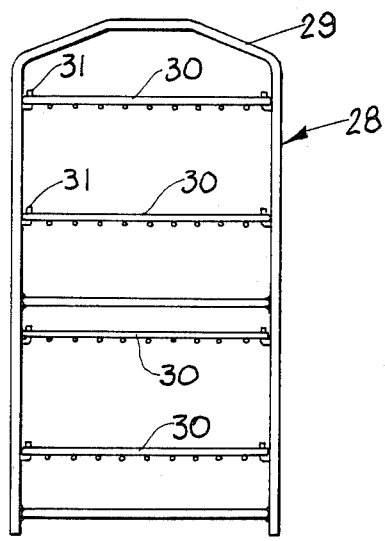
FIG. 4 is an elevational view of a rack which is inserted in the cooking vessel to hold the food being cooked and smoked.

A drip pan 26 is seated on the bottom of the cooking vessel, the drip pan preferably having an annular flange 27 which lies in close proximity to the walls of the vessel, the flange serving as a seat for a rack 28, seen in FIG. 4, on which the meat or other food being cooked and smoked is supported. In the embodiment illustrated, the rack comprises an outer rectangular frame 29 to which a series of grid-like trays 30 are detachably connected, as by means of hooks 31 projecting from the corners of the rack frame 29. The rack frame may be integral with the drip pan, although it is preferred that they be separate. To this end the drip pan may be provided with handle-like loops 32 seen in FIG. 3 by means of which the drip pan may be lifted from the cooking vessel using a hook-like lifting tong.

The cooking vessel is provided with a smoke generating cavity 33 projecting rearwardly from the rear wall of the vessel intermediate its upper and lower ends, as possibly best seen in FIG. 2. The smoke cavity is also formed from stainless steel and is adapted to receive an open top metallic tray 34 in which wood chips may be placed. The tray 34 is of a size to just nicely fit within the cavity 33 and is seated on a heating element 35 which serves to heat the metallic tray 34 to a temperature which will cause the wood chips to char and smolder, thereby producing smoke.

Figure 5:
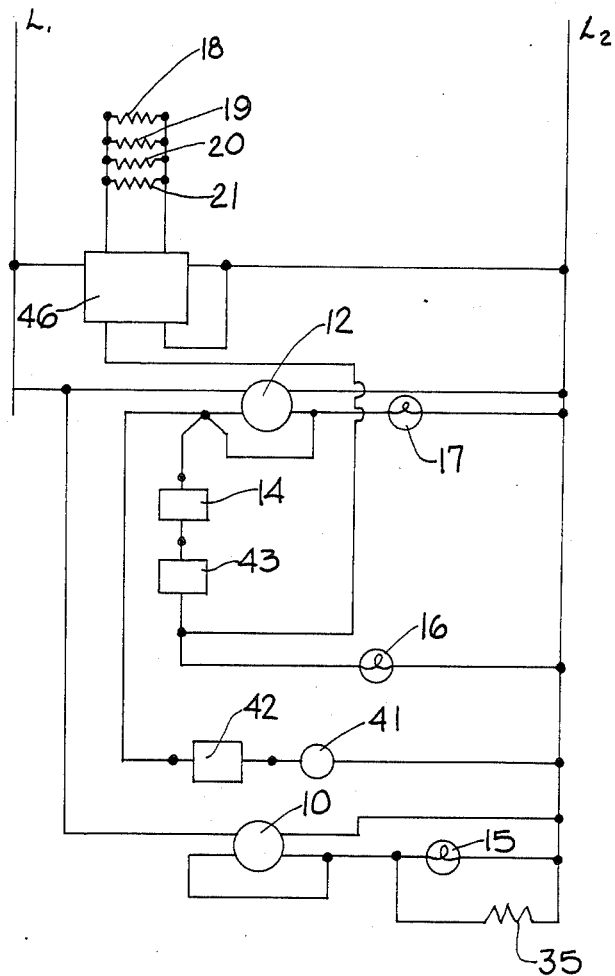
FIG. 5 is a wiring diagram showing the operating controls for the smoker.

As seen in FIG. 3, the cooking vessel is provided with a series of ports, such as the ports 36 and 37 in the cooking vessel, and the additional ports 38, 39 and 40 in the smoke cavity which serve to sense temperature and pressure conditions within the cooking vessel and control the operation of the smoker. In the embodiment illustrated the port 36 is connected to a dump tank (not shown) which releases the pressure in the cooking vessel when a solenoid valve 41, seen in FIG. 5, is opened by the action of pressure switch 42, also seen in FIG. 5. Port 37 contains a temperature sensor and is connected to temperature gauge 14 to give an accurate reading of the temperature within the cooking vessel.

The port 38 in the smoke cavity is connected to the pressure gauge 13 and serves to indicate the pressure in the cooking vessel. Port 39 is a pressure port which is connected to each of the pressure switches 42 and 43 seen in FIG. 5. Port 40 is a pressure relief port connected to each of the pressure relief valves 44 and 45 seen in FIG. 3, which are mounted on the top surface of housing 1. The control circuit shown in FIG. 5 also includes a relay 46 which is actuated by the timer 12 to energize the heating elements 18-21.

OPERATION

Preferably the cooking vessel will be initially preheated to bring the cooking vessel up to the desired starting temperature. Wood chips or other smoke producing materials are placed in the smoke generating tray 34 and inserted in the smoke cavity 33. The food to be cooked is then placed on the rack trays 30 and the racks loaded into the cooking vessel. Alternatively, the rack frame 29 may be seated on the drip pan flange 27 and the individual rack trays 30 filled and sequentially attached to the rack frame.

When the smoker is filled, the lid is placed over the cooking vessel and sealed in place by means of the turn down knobs 5. The smoke and cooking timers 10 and 12, respectively, are then set for the desired cooking and smoking cycles, as is the temperature controller 11 if the cooking temperature requires alteration. The indicator lights 15, 16 and 17 when "on" indicate that the controls are in operation.

When the pressure in the cooking vessel reaches a predetermined limit, preferably about 12 psi, the pressure switch 43 will be actuated to break the circuit to the heating elements 18-21, thereby turning them "off". However, should the pressure within the cooking vessel continue to rise due to latent heat, the pressure switch 42 will be actuated when the pressure reaches a predetermined limit, such as 15 psi, the actuation of swithch 43 serving to open solenoid valve 41 to vent excess pressure from the cooking vessel. When the pressure in the vessel falls below the predetermined 15 psi limit, the valve 41 will reclose. However, the heating elements 18-21 will remain "off" until the pressure in the cooking vessel falls below 12 psi, whereupon the pressure switch 43 will reclose the circuit to the heating elements. When the cooking cycle is completed the timer 12 will break the circuit to the pressure relief valve 41 and the cooking vessel will be vented to the blow tank.

The timer 10 for the smoke heating element 35 operates independently of the timer circuit to the heating elements 18-21 and will remain "on" until the smoke cycle is completed, thereby avoiding interruption to the continued generation of smoke during periods when the heating elements 18-21 are "off", thereby insuring a constant output of smoke.

The smoker is provided with two additional safety valves in the event of malfunction of either of the switches 42 and 43 or the solenoid valve 41. To this end, the pressure relief valve 44 may be preset to a predetermined pressure, such as 17 psi, and will automatically open to vent the cooking vessel if the pressure reaches that level. The pressure relief valve 45 is a manually actuated valve which may be opened by the operator should the necessity arise to vent the cooking vessel.

It has been found that where a stainless steel cooking vessel is used, there is a far lesser tendency for the controls to cycle than when an aluminum cooking vessel is used. This is believed due to the lower rate of heat conductivity of a stainless steel cooking vessel, which results in more constant heat with less opening and closing of pressure relief valve 41. Thus the discharge of both steam and smoke is minimized resulting in more uniform cooking and smoking of the food and a lessening in the loss of moisture, which is particularly important since the only moisture intially available is the natural moisture contained in the food being cooked.

What is claimed is:

1. A pressure smoker comprising a housing, a stainless steel cooking vessel mounted in said housing, said cooking vessel having enclosing front, rear and side walls, a bottom, and an open top having a peripheral edge, a lid adapted to close the open top of the cooking vessel, means for releasably sealing said lid against the peripheral edge of said vessel, a plurality of electric heating elements extending horizontally along the front and side walls of said cooking vessel intermediate the top and bottom ends thereof; the bottom of the cooking vessel and the contiguous lowermost portions of the cooking vessel being free from heating elements, an enclosed smoke cavity projecting outwardly from the rear wall of said cooking vessel centrally thereof, a separate heating element in said smoke cavity, a removable chip tray in said cavity overlying said separate heating element, first control means for energizing and deenergizing said first named heating elements, second control means for energizing said separate heating element, a drip pan adapted to be seated on the bottom wall of said cooking vessel, removable rack means adapted to be inserted in said cooking vessel and seat on said drip pan, and pressure relief means for relieving pressure in said cooking vessel.

2. The pressure smoker claimed in claim 1 wherein said first named heating elements are surrounded by insulation, and wherein the bottom of the cooking vessel is free from insulation.

3. The pressure smoker claimed in claim 1 wherein said cooking vessel is rectangular.

4. The pressure smoker claimed in claim 1 including a control console projecting upwardly from said housing to the rear of said cooking vessel, said first and second control means being mounted on said console.

5. The pressure smoker claimed in claim 1 wherein said first control means comprises a timer for energizing said first named heating elements for a predetermined length of time.

6. The pressure smoker claimed in claim 5 wherein said first control means includes pressure responsive means to deactivate said first named heating elements when a predetermined pressure is reached within the cooking vessel.

7. The pressure smoker claimed in claim 1 wherein said second control means comprises a timer for energizing said separate heating element for a predetermined length of time.

8. The pressure smoker claimed in claim 1 including a third control means comprising a temperature controller for establishing a predetermined temperature in said cooking vessel.

9. The pressure smoker claimed in claim 1 wherein said pressure relief means includes a first pressure relief valve acting to relieve pressure in said cooking vessel when a predetermined pressure is reached.

10. The pressure smoker claimed in claim 9 wherein said pressure relief means includes a second pressure relief valve for manually relieving pressure in said cooking vessel.

11. The pressure smoker claimed in claim 10 wherein said pressure relief means includes a third pressure relief valve for automatically relieving pressure in the cooking vessel in the event of malfunction of said first pressure relief valve.

12. The pressure smoker claimed in claim 1 wherein said rack means comprises a rack frame adapted to be seated on said drip pan, said rack frame projecting upward within said cooking vessel, and a plurality of rack members detachably secured to said rack frame.

* * * * *